United States Patent

[11] 3,598,128

[72] Inventor William M. Chardack
Buffalo, N.Y.
[21] Appl. No. 771,067
[22] Filed Oct. 28, 1968
[45] Patented Aug. 10, 1971
[73] Assignee Medtronic, Inc.
Minneapolis, Minn.

[54] LEAD-STORING PACER
5 Claims, 3 Drawing Figs.

[52] U.S. Cl. 128/419 P, 128/405
[51] Int. Cl. A61n 1/36
[50] Field of Search 128/404, 405, 418, 419 P, 419—424

[56] References Cited
UNITED STATES PATENTS
3,253,595 5/1968 Murphy, Jr. et al. 128/405

*Primary Examiner*—William E. Kamm
*Attorneys*—Lew Schwartz and Donald R. Stone

ABSTRACT: An implantable electrical medical device, especially useful for pediatric implantations, wherein encapsulated electrical circuitry which is adapted to be connected to a lead extending to an electrode connected to the body, has a groove or the like extending around the external periphery of the encapsulating substance, the groove being of sufficient dimension to releasably receive extra lengths of the lead supplied for growth of the body.

PATENTED AUG 10 1971

3,598,128

INVENTOR.
WILLIAM M. CHARDACK
BY
Lew Schwartz
ATTORNEY

LEAD-STORING PACER

BACKGROUND OF THE INVENTION

Implantable electrical medical devices are well known in the art. For example, one of the better known implantable devices is the cardiac pacer, such as is shown in U.S. Pat. No. 3,057,356 to Wilson Greatbach. These devices, such as the cardiac pacer, generally comprise electrical circuitry which is connected by a lead or leads to one or more electrodes, the electrode adapted to be connected to a desired spot within the human body. The implantable devices are embedded in, encapsulated in, or protected by a substance or substances substantially inert to body fluids and tissue. In implantation, it is common practice for the surgeon to create a pocket to receive the somewhat larger and heavier portion of the apparatus comprising the electrical circuitry and its encapsulating substance. The lead will then extend from the pocketed circuitry to the desired spot within the body where the electrode is to be connected. One problem which has been encountered, and is known to those skilled in the art, involves the pediatric implant where one may expect substantial growth of the body in which the implantation is made. Obviously, leads which are of a desirable length when implanted, will no longer be satisfactory as the body grows. It has been determined that successive implants of devices with increasing lead length are undesirable, for the obvious reason that multiple surgery is to be avoided where possible. To implant a device with extra lead length would be an unsatisfactory situation where the extra lead lies free within the body. Normal movement of the body may cause problems with the loose extra lead length causing it to, for example, undesirably entwine itself around a portion of the body. The apparatus of this invention economically overcomes this problem by providing a releasable storage area for the extra lead length. Thus the extra lead is not free to cause possible damage, and multiple surgery is also avoided.

SUMMARY OF THE INVENTION

Briefly described, the apparatus of this invention involves a groove in the external periphery of the substance encapsulating the implantable electrical circuitry to which the lead or leads are to be connected. An aperture is provided through the bottom of the groove into the electrical circuitry through which the lead is to extend for connection to the circuitry. Preferably, another intersecting aperture is provided, through which a member may be threaded for locking the lead in place. The lead is then laid in the groove, which is preferably of sufficient dimension to keep the lead at about the surface level of the encapsulating substance and the groove should be tight enough not to allow the lead to unravel and tight enough not to permit body tissue to grow between lead and groove. If, for example, the encapsulating substance is generally disc shaped, a groove encircling the edge of the disc would hold sufficient extra lead length to allow for normal growth following a pediatric implant. When the lead is in place in the groove, the encapsulated circuitry is placed into the surgically formed pocket and the lead extended to the desired spot in the body to which the electrode is connected. Now, as the body grows, the pull on the lead will cause the pocketed encapsulated circuitry to revolve, thus releasing the extra lead from the groove, as is needed.

DESCRIPTION OF THE PREFERRED EMBODIMENT

Figures 1, 2, 3:
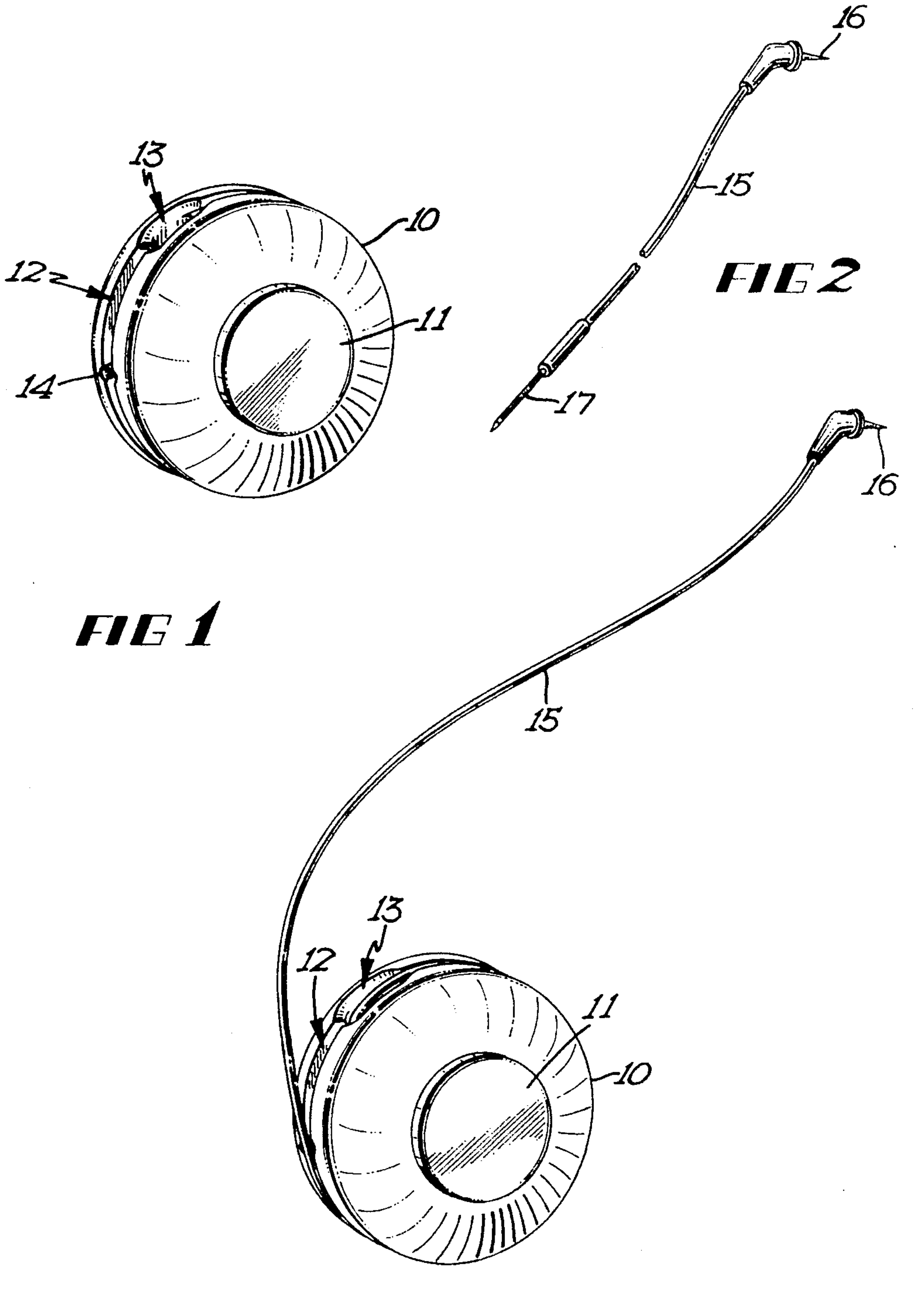
FIG. 1 is a perspective view of one embodiment of the electrical encapsulated circuitry of this invention.
FIG. 2 is a perspective view of a lead and electrode for combining with the apparatus of FIG. 1.
FIG. 3 is a perspective view of the apparatus of FIGS. 1 and 2 as used in combination.

In FIG. 1 there is shown a generally disc-shaped device 10 which constitutes implantable electrical circuitry encapsulated in a substance substantially inert to body fluids and tissue. On the surface of device 10 there is shown a circular metal plate 11 which is connected to the electrical circuitry within device 10 and which acts as an electrode. A groove 12 extends around the edge of disc-shaped member 10. A pair of apertures 13 and 14 is provided through the bottom of groove 12. Aperture 13 extends through the encapsulating substance to a connection point within the electrical circuitry, and is adapted to receive the connecting pin on a lead as described below. Aperture 14 intersects groove 12 and is preferably threaded, for receiving a threaded member to lock the lead connection pin in place when it is in aperture 13.

Referring now to FIG. 2, there is shown one embodiment of a lead and electrode apparatus which can be used with the embodiment of FIG. 1. Lead 15 is encapsulated in a substance substantially inert to body fluids and tissue, and has one end connected to an electrode 16, and another connected to a connection pin 17.

Referring now to FIG. 3, it can be seen that pin 17 extends through aperture 13 to connect the electrical circuitry within device 10. As stated above, a threaded member may be screwed through aperture 14 to hold pin 17 tightly in place. Lead 15 is then placed in groove 12 such that it winds around the edge of disc-shaped device 10, and then extends outwardly to the point in the body to which electrode 16 is to be connected.

Groove 12 is properly dimensioned so that it may receive lead 15 in a releasable manner, and preferably so that lead 15, when within groove 12, is at about the surface level of device 10. In use, the surgeon when implanting the apparatus of this invention as shown in FIG. 3, will prepare a pocket into which device 10 is placed. Device 10, with the portion of lead 15 that is in groove 12, will then be placed in the pocket, generally in the orientation shown in FIG. 3 so that the outwardly extending portion of lead 15 is directed toward the open portion of the surgically made pocket. Electrode 16 is then connected to the desired portion of the body. Now, if the body should grow, as would be the case in a pediatric implantation, the pull of extended lead 15 would cause device 10 to rotate within the pocket. In so rotating, device 10 would release a portion of lead 15 that had been lying in groove 12. Thus, extra lead length is provided only when necessary, in the growing body. No loose extra lead length is provided, thus avoiding a possibly dangerous situation.

This invention has been built and tested according to the embodiment shown in the drawings. The test was made in the body of a living, growing animal, and proved successful.

It will be apparent that other embodiments than that shown and described above may be used without departing from the spirit and scope of this invention. For example, groove 12 could be sufficiently deep to receive several windings of lead 15. Further, lead-holding means other than the groove shown in the drawings may be used, and also, for example, a plurality of grooves could be used for lead storage. In addition, it is intended that he scope of this invention include the use of more than a single lead.

What I claim is:

1. In electrical medical apparatus for implantation in the body of a living animal and including lead means adapted to connect to electrode means, electrical circuitry means, and connection means for connecting the circuitry means to the lead means, all the means being protected by a substance substantially inert to body fluids and tissue, the improvement comprising: lead storage means in operable connection with the substance protecting the circuitry means for receiving and releasably storing at least a portion of the lead means in addition to the connection means.

2. The apparatus of claim 1 in which: the substance protecting the circuitry means is generally disc shaped; and the lead storage means comprises a groove around the edge of the disc-shaped substance, 3. The apparatus of claim 2 in which: said groove stores at least one length of the lead means below the surface level of the disc-shaped substance.

4. The apparatus of claim 3 including: a connection aperture in the bottom of the groove through which the lead means extends for connection to the connection means.

5. The apparatus of claim 4 including: threaded means; a threaded aperture in the bottom of the groove and intersecting the connection aperture; the threaded aperture receiving the threaded means for holding the lead means in the connection aperture.

UNITED STATES PATENT OFFICE
CERTIFICATE OF CORRECTION

Patent No. 3,598,128 Dated August 10, 1971

Inventor(s) William M. Chardack

It is certified that error appears in the above-identified patent and that said Letters Patent are hereby corrected as shown below:

On the cover sheet cancel "[73] Assignee Medtronic, Inc. Minneapolis, Minn.".

Signed and sealed this 25th day of July 1972.

(SEAL)
Attest:

EDWARD M.FLETCHER,JR.
Attesting Officer

ROBERT GOTTSCHALK
Commissioner of Patents

RM PO-1050 (10-69)

USCOMM-DC 60376-P69
☆ U.S. GOVERNMENT PRINTING OFFICE : 1969 O—366-334.